(12) United States Patent
Lee et al.

(10) Patent No.: US 8,630,274 B2
(45) Date of Patent: Jan. 14, 2014

(54) METHOD FOR PROTECTING OPPORTUNITY TO TRANSMIT DATA FRAME IN WIRELESS LAN SYSTEM

(75) Inventors: Il-Gu Lee, Seoul (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 428 days.

(21) Appl. No.: 12/914,745

(22) Filed: Oct. 28, 2010

(65) Prior Publication Data

US 2011/0170525 A1    Jul. 14, 2011

(30) Foreign Application Priority Data

Oct. 28, 2009    (KR) .................. 10-2009-0103039

(51) Int. Cl.
*H04W 4/00*    (2009.01)
(52) U.S. Cl.
USPC ........................................... 370/338
(58) Field of Classification Search
None
See application file for complete search history.

(56) References Cited

U.S. PATENT DOCUMENTS

2007/0133490 A1* 6/2007 Kwon .................. 370/338
2008/0227488 A1   9/2008 Zhu et al.

OTHER PUBLICATIONS

Utsunomiya et al. ("A MAC Protocol for Coexistence between 20/40 MHz STAs for High Throughput WLAN", IEEE, pp. 1136-1140, 2006.*

* cited by examiner

*Primary Examiner* — John Blanton

(57) ABSTRACT

A method for guaranteeing a data frame transmit opportunity in a wireless LAN system having three different transmission modes includes: setting a first transmission protection interval based on a lowest transmission mode, when a node of a mode having a lowest transmission rate among the three transmission modes exists in the wireless LAN system, aggregating a data frame to be transmitted within time of the set transmission protection interval, and transmitting the data frame; and setting a second transmission protection interval based on a mode having a highest transmission rate, when only nodes of a mode having a highest transmission rate among the three transmission modes exist, aggregating a data frame to be transmitted within time of the set transmission protection interval, and transmitting the data frame.

19 Claims, 9 Drawing Sheets

FIG. 1

| Rate (4 bits) | | | | R | Length (12 bits) | | | | | | | | | | | | P | Tail (6 bits) | | | | | |
|---|---|---|---|---|---|---|---|---|---|---|---|---|---|---|---|---|---|---|---|---|---|---|---|
| R1 | R2 | R3 | R4 | | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

FIG. 2

| Modulation and Coding Scheme | | | | | | | CBW 20/40 | HT Length | | | | | | | | | | | | | | | |
|---|---|---|---|---|---|---|---|---|---|---|---|---|---|---|---|---|---|---|---|---|---|---|---|
| LSB | | | | | | MSB | | LSB | | | | | | | | | | | | | | | MSB |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

HT-SIG₁

| Smoothing | Not Sounding | Reserved | Aggregation | STBC | FEC CODING | SHORT GI | Number of Extension Spatial Streams | | CRC | | | | | | | | | Tail Bits | | | | | |
|---|---|---|---|---|---|---|---|---|---|---|---|---|---|---|---|---|---|---|---|---|---|---|---|
| | | | | | | | | C7 | | | | | | | | | C0 | | | | | | |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

LSB (at 4), LSB (at 8)

HT-SIG₂

METHOD FOR PROTECTING OPPORTUNITY TO TRANSMIT DATA FRAME IN WIRELESS LAN SYSTEM

CROSS-REFERENCE(S) TO RELATED APPLICATIONS

The present application claims priority of Korean Patent Application No(s). 10-2009-0103039, filed on Oct. 28, 2009, which is incorporated herein by reference in its entirety.

BACKGROUND OF THE INVENTION

1. Field of the Invention

Exemplary embodiments of the present invention relate to a transmission method and control technology for protecting transmit opportunities in a wireless LAN.

2. Description of Related Art

IEEE (Institute of Electrical and Electronics Engineers) 802.11a/g standards for wireless LANs can support a transmission rate of 54 Mbps. Such IEEE 802.11a/g standards are designed to use a single antenna and a bandwidth of 20 MHz. In contrast, IEEE 802.11n standards can improve the transmission rate by using multi-antenna technology, i.e. use of a plurality of antennas, and bandwidth extension transmission technology, i.e. use of 40 MHz bandwidth. To be specific, IEEE 802.11n standards can support up to four antennas and can support a maximum of 600 Mbps physical layer transmission rate by applying a 64-QAM modulation scheme, a ⅚ code rate, and a short guard interval mode in a bandwidth of 40 MHz. In the MAC layer, furthermore, aggregation technology and BA (Block Acknowledge) technology are employed so that a throughput corresponding to about 86% of the physical layer transmission rate is obtained theoretically.

An important issue requiring consideration together with the history of establishment of wireless LAN standards is the backward compatibility problem. This means that, even in a network where IEEE 802.11a/g standard equipment and IEEE 802.11n standard equipment coexist, channels should be occupied according to a wireless LAN protocol based on fair competition without causing signal collision. To this end, IEEE 802.11n standards employ an L-SIG TXOP protection (Legacy Signal Field Transmit Opportunity protection) scheme. Specifically, during a TXOP interval in which a HT (High Throughput) mode (which is another name of IEEE 802.11n) packet (11n mode packet) is transmitted, a legacy signal field is used to set time to transmit the HT-mode packet so that legacy mobile stations, which failed to obtain rights to occupy channels, are prevented from occupying channels, thereby avoiding signal collision due to legacy equipment.

Recently, IEEE 802.11ac is extensively discussing VHT (Very High Throughput) technology as the next-generation wireless LAN technology. The IEEE 802.11ac standards are supposed to employ multi-user multi-antenna technology and multi-channel technology, and to have a longer period of time during which an access point and at least one mobile station occupy a channel. In summary, consideration of the above-mentioned problems based on such technical background reveals limitations of conventional TXOP protection methods using legacy signal fields.

SUMMARY OF THE INVENTION

An embodiment of the present invention is directed to a TXOP protection method compatible with a legacy mode in a wireless LAN system.

Another embodiment of the present invention is directed to a method for improving throughput in a wireless LAN system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for guaranteeing a data frame transmit opportunity in a wireless LAN system having three different transmission modes includes: setting a transmission protection interval based on a lowest transmission mode, when a node of a mode having a lowest transmission rate among the three transmission modes exists in the wireless LAN system; and aggregating a signal field indicating the transmission protection interval to a data frame to be transmitted within time of the set transmission protection interval and transmitting the data frame.

In accordance with another embodiment of the present invention, a method for guaranteeing a data frame transmit opportunity in a wireless LAN system having three different transmission modes includes: setting a first transmission protection interval based on a lowest transmission mode, when a node of a mode having a lowest transmission rate among the three transmission modes exists in the wireless LAN system, aggregating a data frame to be transmitted within time of the set transmission protection interval, and transmitting the data frame; and setting a second transmission protection interval based on a mode having a highest transmission rate, when only nodes of a mode having a highest transmission rate among the three transmission modes exist, aggregating a data frame to be transmitted within time of the set transmission protection interval, and transmitting the data frame.

In accordance with another embodiment of the present invention, a method for guaranteeing a data frame transmit opportunity in a wireless LAN system having three different transmission modes includes: setting a first transmission protection interval based on a lowest transmission mode, when a node of a mode having a lowest transmission rate among the three transmission modes exists in the wireless LAN system, aggregating a data frame to be transmitted within time of the set transmission protection interval, and transmitting the data frame; and setting a second transmission protection interval based on a mode having a highest transmission rate, when only nodes of a mode having a second highest transmission rate among the three transmission modes exist, aggregating a data frame to be transmitted within time of the set transmission protection interval, and transmitting the data frame.

BRIEF DESCRIPTION OF THE DRAWINGS

FIG. 1 illustrates a legacy-mode signal field format.

FIG. 2 illustrates HT-mode signal field formats.

DESCRIPTION OF SPECIFIC EMBODIMENTS

Figure 3:
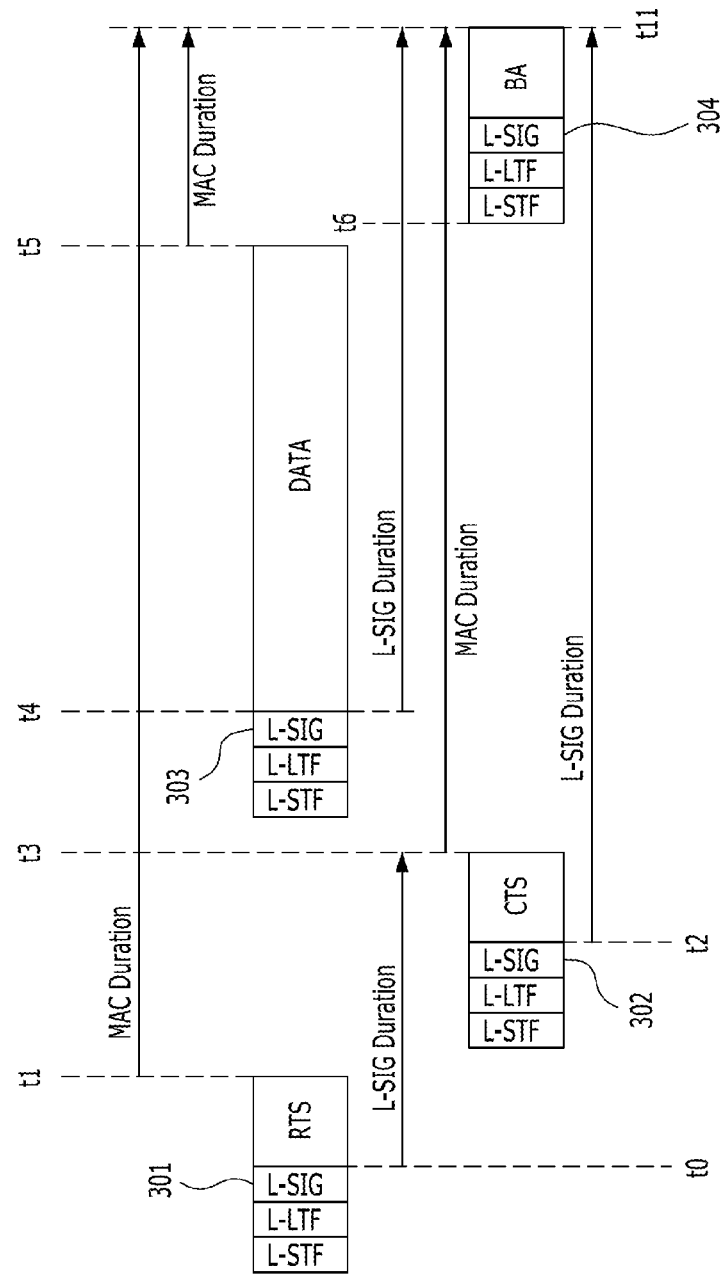
FIG. 3 is a timing diagram illustrating a TXOP protection method using a legacy signal field in a wireless LAN system, which has currently been commercialized.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Prior to describing the present invention, a legacy mode and a HT mode will now be described.

FIG. 1 illustrates a legacy-mode signal field format, and FIG. 2 illustrates HT-mode signal field formats.

In FIGS. 1 and 2, numbers on the bottom indicate the order of respective bits constituting the signal field formats. For example, "0" refers to the first bit, "4" refers to the fifth bit, and "23" refers to the 24$^{th}$ bit. There are also descriptions, above the fields, regarding which information respective bits indicate. For example, in FIG. 1, "Rate (4 bits)" indicates the transmission rate, consisting of four bits, and "Length (12 bits)" corresponds to a field indicating the data packet length, consisting of 12 bits.

As such, signal fields contain descriptions of various types of information necessary to detect and decode corresponding packets and, among them, the most representative information concerns the packet length and transmission rate. For example, in the case of a legacy mode as illustrated in FIG. 1, 12 bits are allocated for the packet length information so as to represent up to a 4096-byte length, and the minimum transmission rate is 6 Mbps. FIG. 2 illustrates exemplary HT-SIG$_1$ and HT-SIG$_2$. The overlying HT-SIG$_1$ will be described first: in the case of a HT mode, 16 bits ranging from the 9$^{th}$ to 24$^{th}$ bit are allocated for the packet length information so as to represent a maximum of 65536-byte length, and the minimum transmission rate is 6.5 Mbps. The underlying HT-SIG$_2$ includes signal fields configured to operate in the HT mode only.

Problems occurring in the absence of a legacy signal field TXOP protection scheme will now be described with reference to examples.

When HT-mode packets are aggregated and transmitted, the maximum packet length transmittable is 65536 bytes. If no legacy signal field TXOP protection scheme is employed, legacy equipment has no HT packet signal information, and may attempt to acquire a channel occupation right before the 65536 byte-length packet is completely transmitted. Therefore, it becomes necessary to set information regarding the period of time, during which the channel will be occupied due to the HT packet transmission, and provide mobile stations with the information using the transmission rate and packet length information of legacy signal fields. This will interrupt channel access attempts by legacy equipment and avoid signal collision. That is, the above-mentioned problems are prevented by the legacy signal field TXOP protection scheme adopted by IEEE 802.11n standards.

However, the legacy signal field TXOP protection scheme adopted by the standards cannot fully support the HT-mode aggregation scheme. Specifically, the packet length field of a legacy signal field is limited to 12 bits, which means that the legacy signal field TXOP protection interval is supported not more than 5.5 ms (maximum TXOP protection interval=maximum packet length/minimum transmission rate=4096 bytes/6 Mpbs=5.5 ms). In contrast, coherence time in indoor space where wireless LANs are commonly employed is 1.2 s at most, and has a value ranging from 500-100 ms depending on the degree of Doppler's effect. The throughput is defined by Equation 1 below.

$$\text{Throughput} = \text{transmitted data length}/\text{transmission time} \quad (1)$$

As defined by Equation 1 above, the throughput is obtained by dividing the length of transmitted data by the transmission time, meaning that, in order to improve throughput, the overhead related to the length of data to be transmitted needs to be minimized. Aggregation technology employed in wireless LANs can efficiently minimize such overhead. In other words, the throughput efficiency is improved by aggregating and sending data as long as possible for each transmission. In actual wireless LAN channel environments, coherence time of at least hundreds of ms is guaranteed, but wireless LAN standards can only support a TXOP protection interval of 5.5 ms, which means that resources of environments commonly employing wireless LANs are not utilized to the greatest extent.

This will now be described in more detail with reference to Tables 1 and 2 given below, which correspond to cases supporting 20 MHz and 40 MHz, respectively.

TABLE 1

| 20 MHz | DATA RATE [Mbps] | Mode HT_DURATION [ms] | Normal Ack Max. Throughput [Mbps] | Aggregation, Block Ack HT_DURATION [ms] | Max. Throughput [Mbps] |
|---|---|---|---|---|---|
| MCS0 | 6.5 | 5.04 | 2 | 80.66 | 6 |
| MCS1 | 13 | 2.52 | 4 | 40.33 | 11 |
| MCS2 | 19.5 | 1.68 | 6 | 26.89 | 17 |
| MCS3 | 26 | 1.26 | 8 | 20.16 | 22 |
| MCS4 | 39 | 0.84 | 12 | 13.44 | 34 |

TABLE 1-continued

| Mode 20 MHz | DATA RATE [Mbps] | Normal Ack | | Aggregation, Block Ack | |
|---|---|---|---|---|---|
| | | HT_DURATION [ms] | Max. Throughput [Mbps] | HT_DURATION [ms] | Max. Throughput [Mbps] |
| MCS5 | 52 | 0.63 | 16 | 10.08 | 45 |
| MCS6 | 58.5 | 0.56 | 18 | 8.96 | 50 |
| MCS7 | 65 | 0.50 | 20 | 8.07 | 56 |
| MCS8 | 13 | 2.52 | 4 | 40.33 | 11 |
| MCS9 | 26 | 1.26 | 8 | 20.16 | 22 |
| MCS10 | 39 | 0.84 | 12 | 13.44 | 34 |
| MCS11 | 52 | 0.63 | 16 | 10.08 | 45 |
| MCS12 | 78 | 0.42 | 23 | 6.72 | 67 |
| MCS13 | 104 | 0.32 | 31 | 5.04 | 89 |
| MCS14 | 117 | 0.28 | 35 | 4.48 | 101 |
| MCS15 | 130 | 0.25 | 39 | 4.03 | 112 |

TABLE 2

| Mode 40 MHz | DATA RATE [Mbps] | Normal Ack | | Aggregation, Block Ack | |
|---|---|---|---|---|---|
| | | HT_DURATION [ms] | Max. Throughput [Mbps] | HT_DURATION [ms] | Max. Throughput [Mbps] |
| MCS0 | 13.5 | 2.43 | 4 | 38.84 | 12 |
| MCS1 | 27 | 1.21 | 8 | 19.42 | 23 |
| MCS2 | 40.5 | 0.81 | 12 | 12.95 | 35 |
| MCS3 | 54 | 0.61 | 16 | 9.71 | 46 |
| MCS4 | 81 | 0.40 | 24 | 6.47 | 70 |
| MCS5 | 108 | 0.30 | 32 | 4.85 | 93 |
| MCS6 | 121.5 | 0.27 | 36 | 4.32 | 104 |
| MCS7 | 135 | 0.24 | 41 | 3.88 | 116 |
| MCS8 | 27 | 1.21 | 8 | 19.42 | 23 |
| MCS9 | 54 | 0.61 | 16 | 9.71 | 46 |
| MCS10 | 81 | 0.40 | 24 | 6.47 | 70 |
| MCS11 | 108 | 0.30 | 32 | 4.85 | 93 |
| MCS12 | 162 | 0.20 | 49 | 3.24 | 139 |
| MCS13 | 216 | 0.15 | 65 | 2.43 | 186 |
| MCS14 | 243 | 0.13 | 73 | 2.16 | 209 |
| MCS15 | 270 | 0.12 | 81 | 1.94 | 232 |

Tables 1 and 2 above enumerate the transmission time and throughput when a 65536 byte-length HT-mode packet is transmitted. It is clear from the tables that, in Table 1, aggregation is possible only in the case of MCS13, MCS14, and MCS15 and, in Table 2, aggregation is possible only in the case of MCS5, MCS6, MCS7, MCS11-MCS15. That is, in other modes, the legacy signal field TXOP protection interval is exceeded, causing problems.

Hereinafter, a transmission method and control technology for TXOP protection in a wireless LAN in accordance with the present invention will be described. The following two methods are used as methods for complementing conventional TXOP protection schemes using legacy signal fields.

The first method employs an adaptive aggregation packet length determination scheme, and the second method employs a TXOP protection interval setup scheme for VHT-mode packet support. The first method will now be described.

It has been mentioned with reference to Tables 1 and 2 that a number of transmission rates are unusable because TXOP interval protection is not guaranteed in connection with the maximum length. Therefore, the present invention improves throughput by determining and limiting the aggregation packet length, in the case of 40 MHz as shown in Table 3 below, to TXOP time that can be protected by a legacy signal field.

TABLE 3

| Mode 40 MHz | DATA RATE [Mbps] | Normal Ack | | Aggregation, Block Ack | |
|---|---|---|---|---|---|
| | | HT_DURATION [ms] | Max. Throughput [Mbps] | HT_DURATION [ms] | Max. Throughput [Mbps] |
| MCS0 | 13.5 | 2.43 | 4 | 5.33 | 6 |
| MCS1 | 27 | 1.21 | 8 | 5.33 | 18 |
| MCS2 | 40.5 | 0.81 | 12 | 5.33 | 30 |
| MCS3 | 54 | 0.61 | 16 | 5.33 | 43 |
| MCS4 | 81 | 0.40 | 24 | 5.33 | 69 |
| MCS5 | 108 | 0.30 | 32 | 4.85 | 93 |
| MCS6 | 121.5 | 0.27 | 36 | 4.32 | 104 |
| MCS7 | 135 | 0.24 | 41 | 3.88 | 116 |

TABLE 3-continued

| Mode | Normal Ack | | | Aggregation, Block Ack | |
|---|---|---|---|---|---|
| 40 MHz | DATA RATE [Mbps] | HT_DURATION [ms] | Max. Throughput [Mbps] | HT_DURATION [ms] | Max. Throughput [Mbps] |
| MCS8 | 27 | 1.21 | 8 | 5.33 | 18 |
| MCS9 | 54 | 0.61 | 16 | 5.33 | 43 |
| MCS10 | 81 | 0.40 | 24 | 5.33 | 69 |
| MCS11 | 108 | 0.30 | 32 | 4.85 | 93 |
| MCS12 | 162 | 0.20 | 49 | 3.24 | 139 |
| MCS13 | 216 | 0.15 | 65 | 2.43 | 186 |
| MCS14 | 243 | 0.13 | 73 | 2.16 | 209 |
| MCS15 | 270 | 0.12 | 81 | 1.94 | 232 |

It is to be noted that, although there may be a number of factors determining the aggregation packet length, what has solely been taken into consideration in Table 3 is TXOP time that can be guaranteed by a legacy signal field, as well as coherence time. However, those skilled in the art can understand that other channel states, such as signal-to-noise ratio, can also be used.

A TXOP protection interval setup method for VHT-mode packet support will now be described.

Currently commercialized schemes for setting TXOP protection intervals using legacy signal fields in wireless LAN systems simply consider a single aggregation packet. However, in the case of VHT-mode packets, which have recently been discussed, it is expected that multi-user multi-antenna technology and multi-channel technology will be used synchronously and asynchronously. Therefore, simple consideration of the transmission time of a single aggregation packet, as in the case of the conventional methods, could cause problems. This will now be described with reference to FIG. 3.

FIG. 3 is a timing diagram illustrating a TXOP protection method using a legacy signal field in a wireless LAN system, which has currently been commercialized.

Close observation shows that intervals for TXOP protection of L-SIG fields vary depending on the type of respective frames. Specifically, the L-SIG field 301 added to the RTS (Ready-to-Send) frame in the TXOP protection scheme has a protection interval set from time t0 to time t3 in the case of each frame. The L-SIG 302 added to the CTS (Clear-to-Send) frame has a protection interval set from time t2 to time t11. The L-SIG field 303 included in the data frame has a protection interval set from time t4 to time t11. The L-SIG field 304 included in the BA frame has a protection interval set from time t6 to time t11.

Those protection intervals can be expressed mathematically by Equations 2 and 3 below.

L-SIG duration of RTS and data packets=transmission time of corresponding packets (excluding preamble and signal field)+SIFS (Short Inter-Frame Space) time+acknowledgement packet transmission time (2)

L-SIG duration of CTS packet=CTS transmission time (excluding preamble and signal field)+SIFS time+data packet transmission time+acknowledgement packet transmission time (3)

Mobile stations, which have failed to acquire channel occupation rights, use L-SIG duration values obtained from Equations 2 and 3 above to set a NAV (Network Allocation Vector) value, decrease the timer as much as the NAV value as time elapses, and attempt to obtain channel occupation rights when the timer expires.

However, since equipment supporting the VHT mode employs multi-user multi-antenna technology and multi-channel transmission scheme, the same principle cannot be used to set the L-SIG duration.

Therefore, the present invention includes a L-SIG duration setup scheme in the case of employing multi-user multi-antenna technology, a multi-channel transmission scheme, or both of them.

Figure 4:
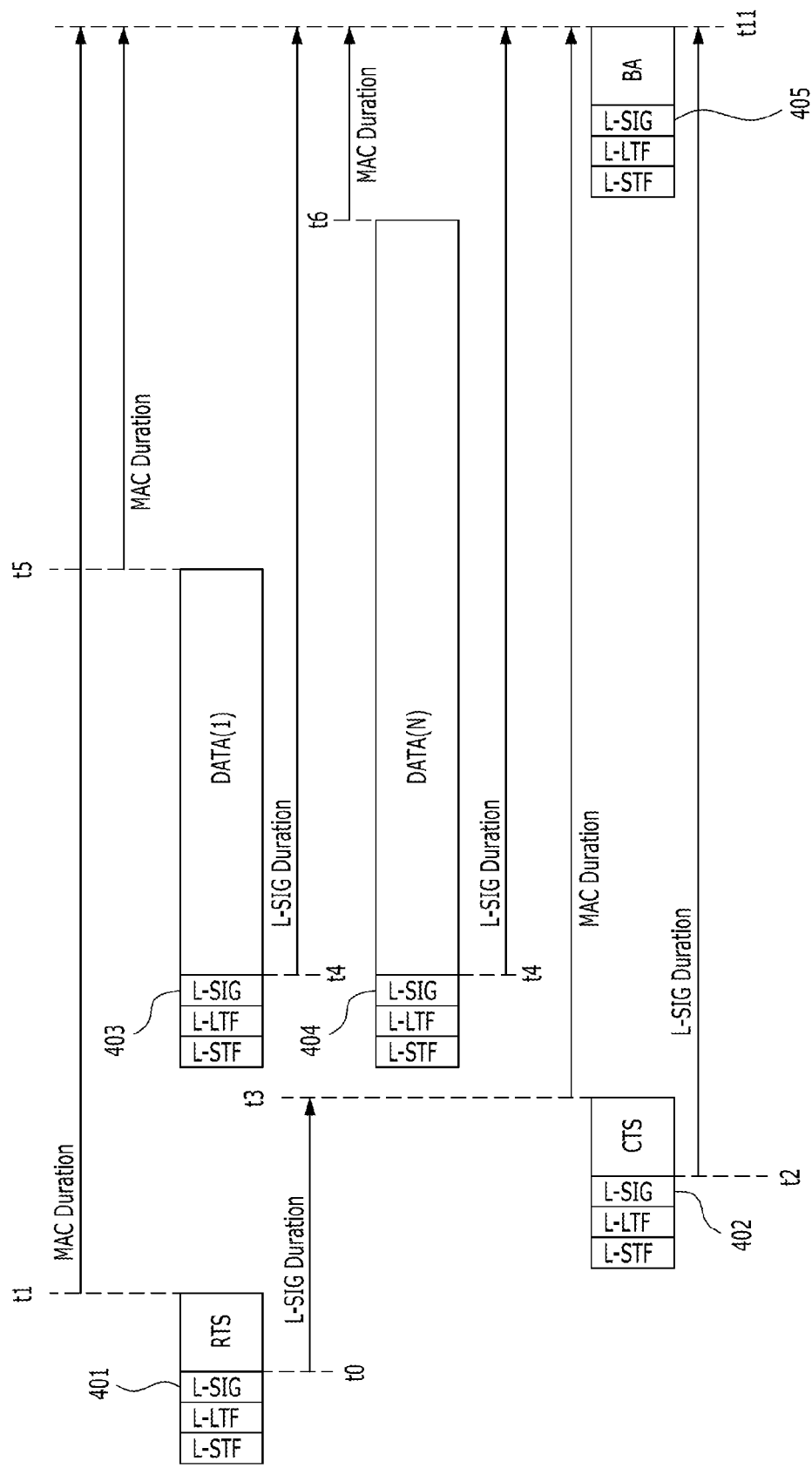
FIG. 4 is a timing diagram illustrating a TXOP interval protection scheme using a legacy signal field during VHT-mode packet transmission in accordance with the present invention.

FIG. 4 is a timing diagram illustrating a TXOP interval protection scheme using a legacy signal field during VHT-mode packet transmission in accordance with the present invention.

Referring to FIG. 4, the RTS frame, the CTS frame, the data frames, and the BA frame include L-SIG fields 401, 402, 403, 405, and 405, respectively, which have durations of protection intervals as illustrated in FIG. 4. For example, the L-SIG field 401 of the RTS frame has a protection interval from time t0 to time t3, and the L-SIG field 402 of the CTS frame has a protection interval from time t2 to time t11.

Meanwhile, as illustrated in FIG. 4, two packets may be transmitted by different users using multi-user multi-antenna technology, or different data packets may be transmitted through different channels using multi-channel transmission technology. In this case, the L-SIG duration must be set differently depending on the transmission scheme of the VHT mode. Specifically, in the case of a synchronous scheme, a value corresponding to the length of a packet aggregated the most long should be used, and in the case of an asynchronous scheme, transmission time ranging from the first transmitted packet to the last one should be used, as defined by Equations 4 and 5 below.

L-SIG duration of corresponding packet in case of synchronous VHT-mode packet=Max(transmission time for multiple packets (excluding preamble and signal field))+SIFS time+acknowledgement packet transmission time (4)

L-SIG duration of corresponding packet in case of asynchronous VHT-mode packet=transmission time from first packet (excluding preamble and signal field) to last packet+SIFS time+acknowledgement packet transmission time (5)

Equations 4 and 5 above correspond to signal field setup schemes for TXOP protection using legacy signal fields in synchronous and asynchronous cases, respectively.

Descriptions so far concern transmission schemes for complementing conventional TXOP protection schemes using legacy signal fields. The above-mentioned two schemes proposed by the present invention are applicable to networks including legacy equipment.

On the other hand, performance can be further improved in environments having no legacy equipment. Conventional 802.11n wireless LAN standards support a mixed mode, which is employed when 11a/g and 11n wireless LAN standards coexist, and a Greenfield mode, which is employed when 11n is solely used. When VHT-mode packets are used in the future, the overhead portion for legacy compatibility can be removed by using a HT/VHT mixed mode, which uses HT and VHT modes only, or a VHT Greenfield mode, thereby improving throughput. Considering such cases, the present invention includes a transmission scheme for TXOP protection using HT signal fields.

Figure 5:
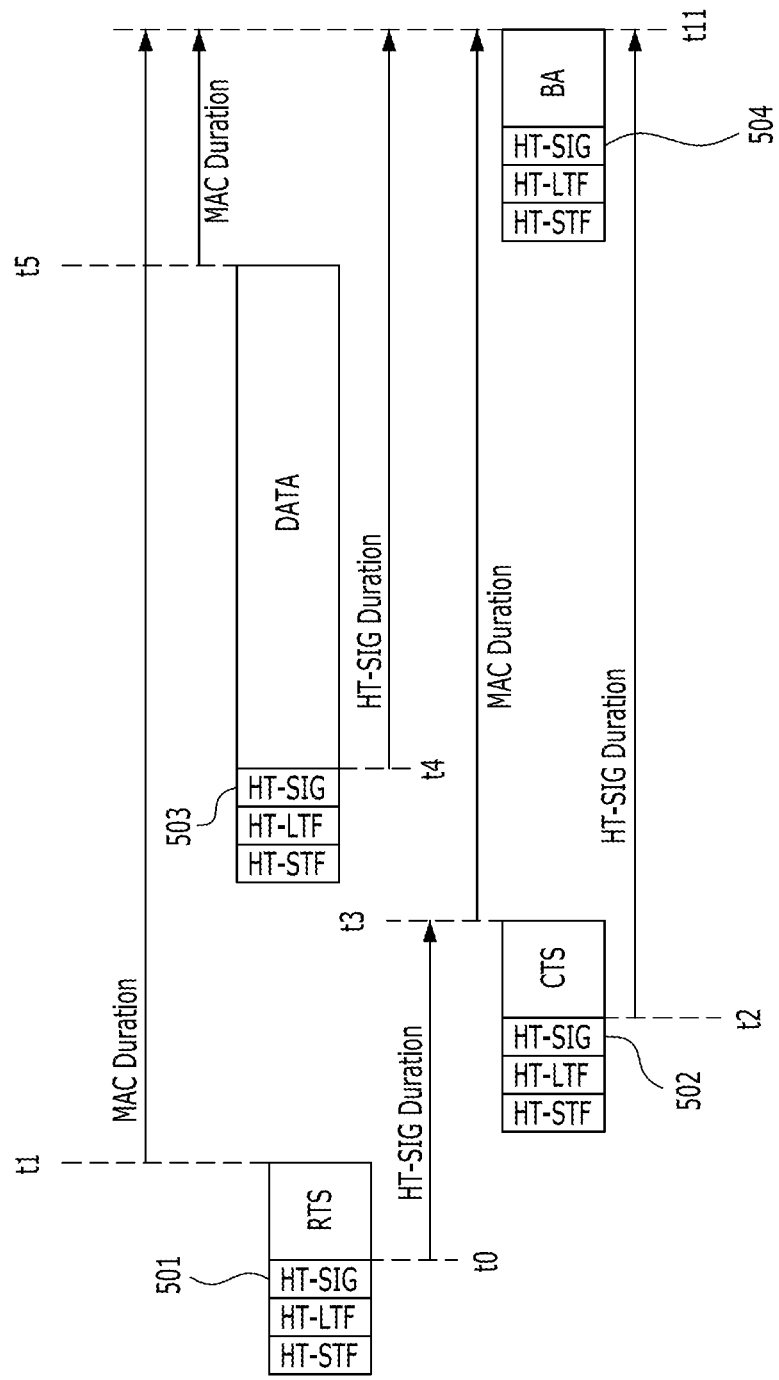
FIG. 5 is a timing diagram illustrating a TXOP interval protection scheme using a HT signal field during HT/VHT mixed-mode packet transmission in accordance with an embodiment of the present invention.
Figure 6:
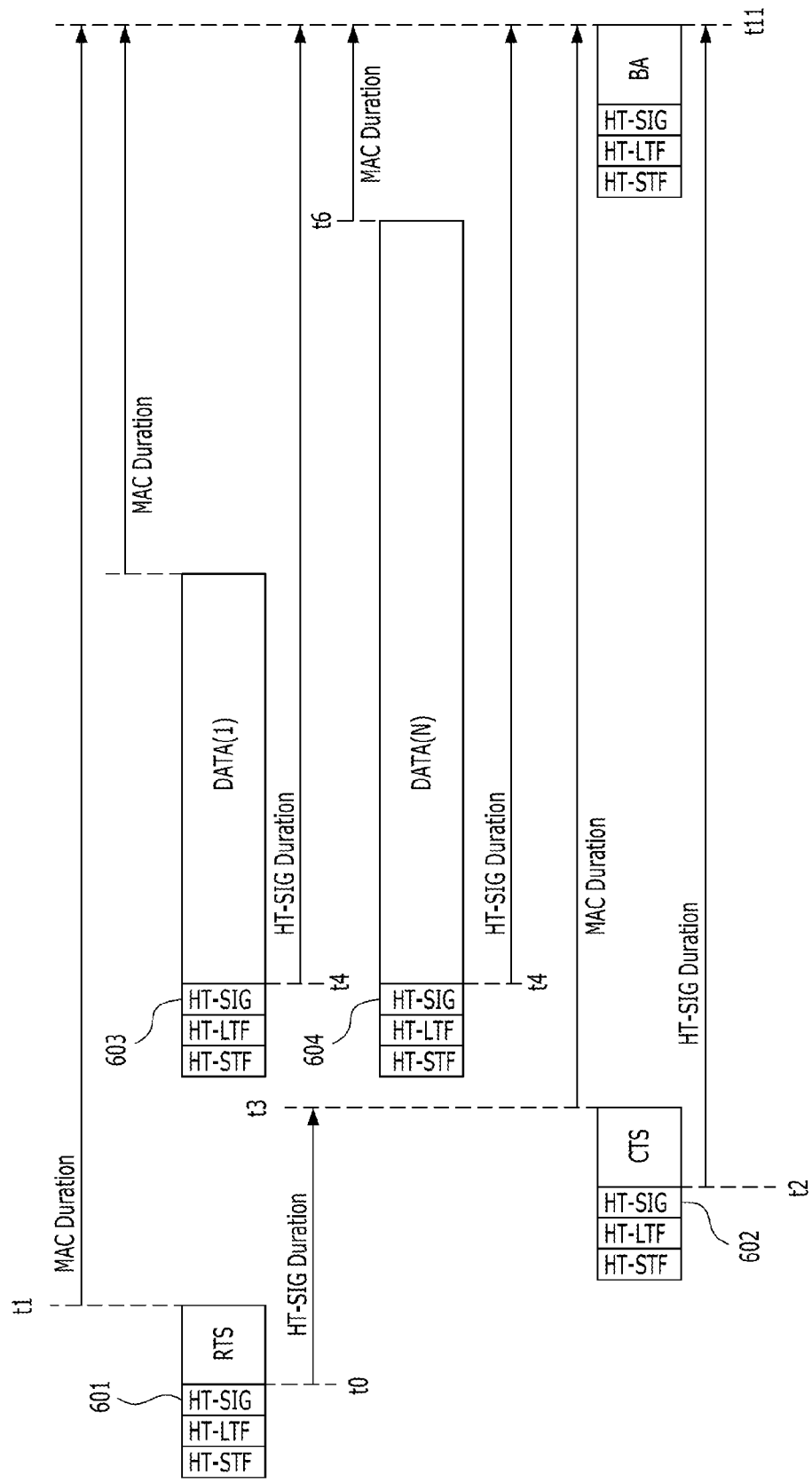
FIG. 6 is a timing diagram illustrating a TXOP interval protection scheme using a HT signal field during HT/VHT mixed-mode packet transmission in accordance with another embodiment of the present invention.

FIG. 5 is a timing diagram illustrating a TXOP interval protection scheme using a HT signal field during HT/VHT mixed-mode packet transmission in accordance with an embodiment of the present invention. FIG. 6 is a timing diagram illustrating a TXOP interval protection scheme using a HT signal field during HT/VHT mixed-mode packet transmission in accordance with another embodiment of the present invention.

Both schemes illustrated in FIGS. 5 and 6 determine protection intervals using HT-SIG fields 501, 502, 503, and 504; 601, 602, 603, 604, and 605 in the RTS/CTS frames, data frames, and BA frames.

For example, in the case of the embodiment illustrated in FIG. 5, the HT-SIG field 501 included in the RTS frame sets a protection interval from time t0 to time t3, and the HT-SIG field 502 included in the CTS frame sets a protection interval from time t2 to time t11. Similarly, in the case of the embodiment illustrated in FIG. 6, the HT-SIG field 601 included in the RTS frame sets a protection interval from time t0 to time t3, and the HT-SIG field 602 included in the CTS frame sets a protection interval from time t2 to time t11.

Comparison between FIGS. 5 and 6 shows that neither a multi-user multi-antenna mode transmission scheme nor a multi-channel transmission scheme is employed in FIG. 5, while a multi-user multi-antenna mode transmission scheme or a multi-channel transmission scheme is employed in FIG. 6. Therefore, only a single data packet (frame) is transmitted in the configuration of FIG. 5, while a number of data packets (frames) are transmitted in the configuration of FIG. 6.

In the case of a mixed mode of HT and VHT modes, a packet length of up to 65536 bytes can be expressed using a HT signal field, not a legacy signal field (16 bits), the former having four bits more than the latter, so that 81 ms support is possible using the minimum HT-mode transmission rate of 6.5 Mbps. In this connection, the present invention includes the following settings: the channel type in the HT signal field format of FIG. 2 is 20 MHz mode; MCS0 is selected; and HT LENGTH portion (packet length) is given a value obtained by calculating time necessary to transmit the corresponding packet.

Based on the above-mentioned description, the NAV value in the case of synchronous VHT mode and in the case of asynchronous VHT mode can be obtained by Equations 6 to 8 below.

HT-SIG duration of corresponding data packet in case of synchronous VHT-mode packet=Max(transmission time for multiple packets (excluding preamble and signal field))+SIFS time+acknowledgement packet transmission time (6)

HT-SIG duration of corresponding data packet in case of asynchronous VHT-mode packet=transmission time from first packet (excluding preamble and signal field) to last packet+SIFS time+acknowledgement packet transmission time (7)

NAV=HT-SIG duration−TXTIME+aPreambleLength+aPLCPHeaderLength (8)

In Equation 8 above, TXTIME refers to time necessary to transmit the entire PPDU; aPreambleLength refers to time necessary to transmit HT-STF+HT-LTF; and aPLCPHeaderLength refers to time necessary to transmit HT-SIG.

Figure 7:
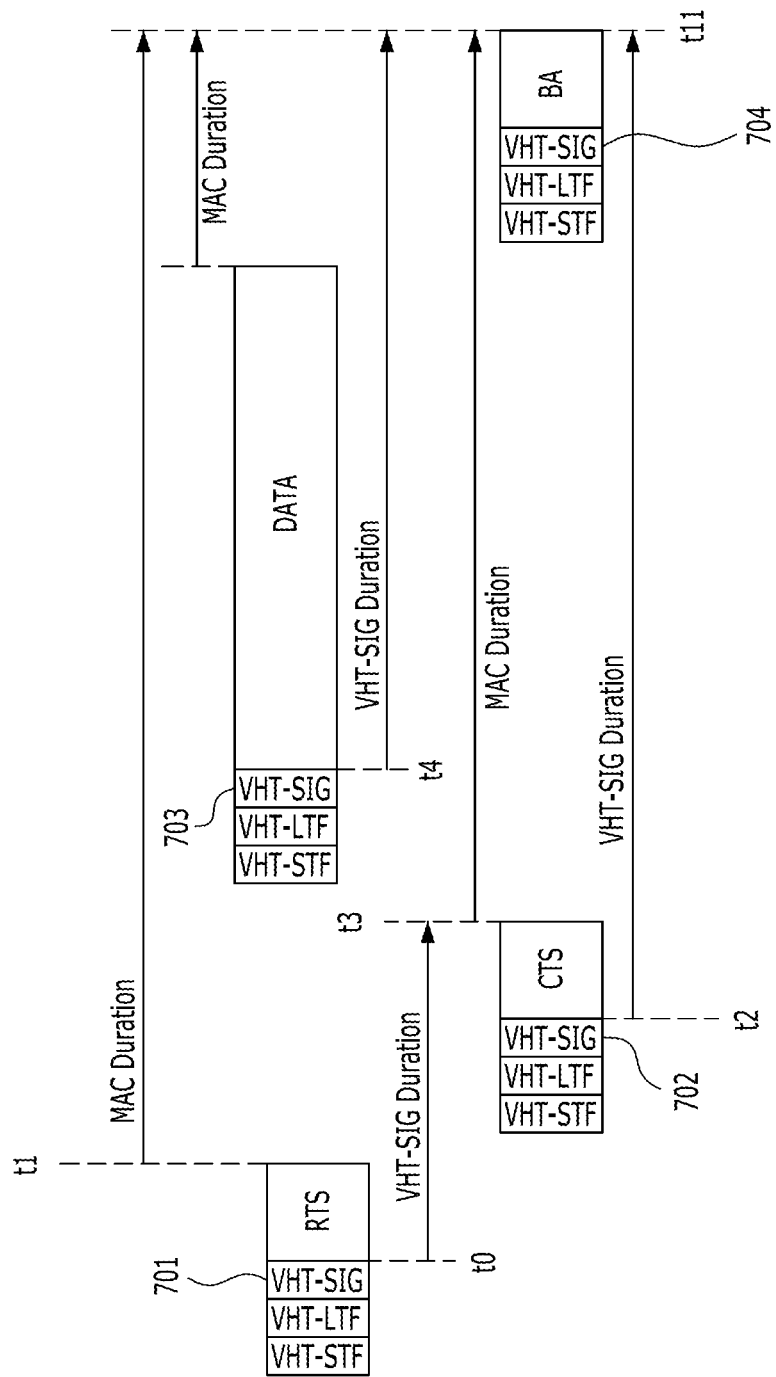
FIG. 7 is a timing diagram illustrating a TXOP interval protection scheme using a VHT signal field during VHT Greenfield-mode packet transmission in accordance with an embodiment of the present invention.
Figure 8:
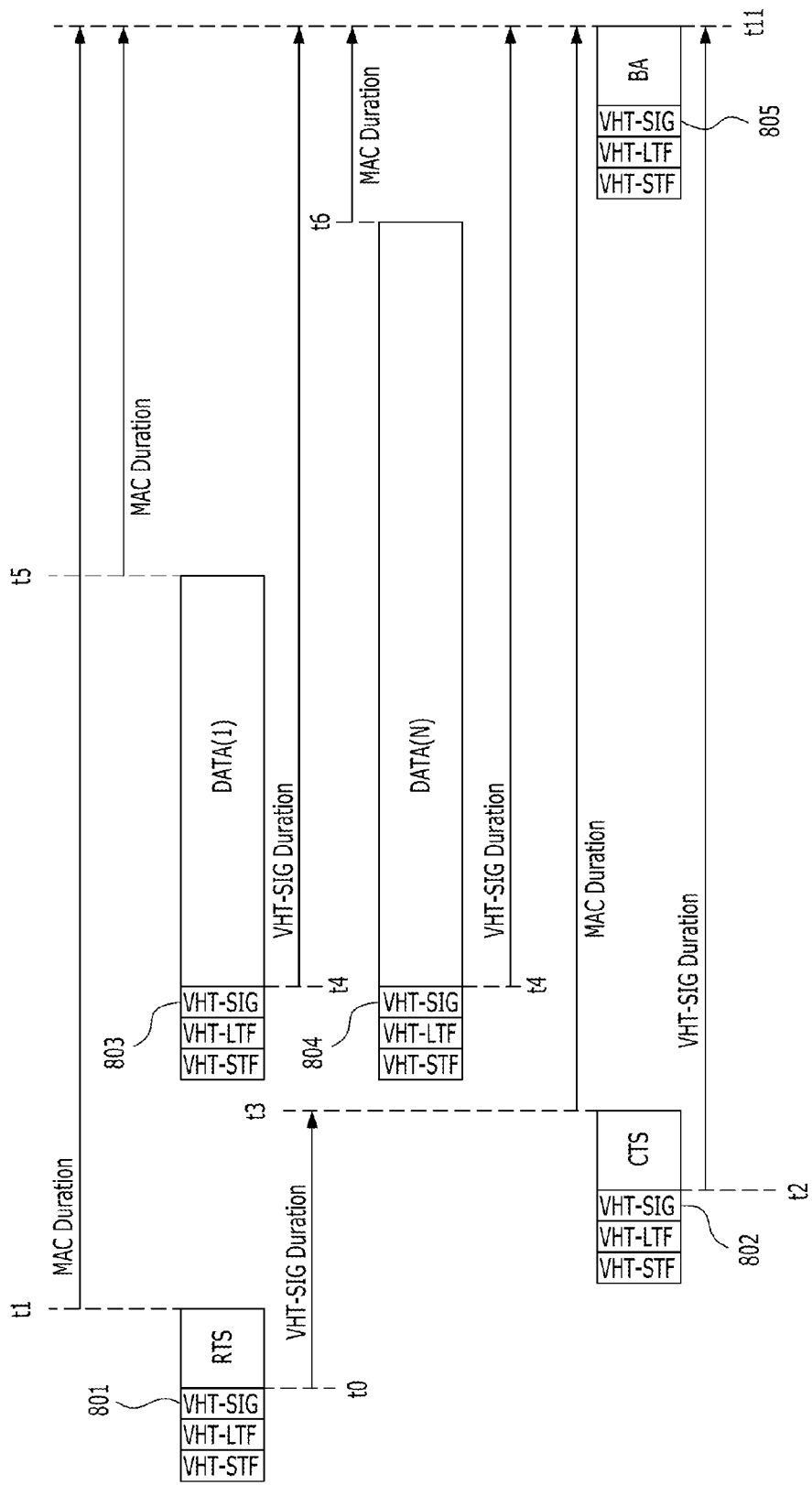
FIG. 8 is a timing diagram illustrating a TXOP interval protection scheme using a VHT signal field during VHT Greenfield-mode packet transmission in accordance with another embodiment of the present invention.

FIG. 7 is a timing diagram illustrating a TXOP interval protection scheme using a VHT signal field during VHT Greenfield-mode packet transmission in accordance with an embodiment of the present invention. FIG. 8 is a timing diagram illustrating a TXOP interval protection scheme using a VHT signal field during VHT Greenfield-mode packet transmission in accordance with another embodiment of the present invention.

Both schemes illustrated in FIGS. 7 and 8 determine protection intervals using VHT-SIG fields 701, 702, 703, and 704; 801, 802, 803, 804, and 805 in the RTS/CTS frames, data frames, and BA frames.

For example, in the case of the embodiment illustrated in FIG. 7, the VHT-SIG field 701 included in the RTS frame sets a protection interval from time t0 to time t3, and the VHT-SIG field 702 included in the CTS frame sets a protection interval from time t2 to time t11. Similarly, in the case of the embodiment illustrated in FIG. 8, the VHT-SIG field 801 included in the RTS frame sets a protection interval from time t0 to time t3, and the VHT-SIG field 802 included in the CTS frame sets a protection interval from time t2 to time t11.

Comparison between FIGS. 7 and 8 shows that neither a multi-user multi-antenna mode transmission scheme nor a multi-channel transmission scheme is employed in FIG. 7, while a multi-user multi-antenna mode transmission scheme or a multi-channel transmission scheme is employed in FIG. 8.

In the case of a VHT Greenfield mode, a larger packet length can be expressed using more fields other than legacy signal fields or HT signal fields. The packet length of a VHT signal field necessary for this can be calculated by Equation 9 below.

$$T=(2^N)*8*1000/(R*10^6)[ms] \quad (9)$$

In Equation 9 above, T refers to the maximum transmission time supportable, N refers to the number of bits allocated to VHT-LENGTH, and R refers to the minimum transmission rate supportable.

According to Equation 9 above, N=16, 17, 18, 19, 20 bits, which correspond to 81, 161, 322, 645, 1290 ms, respectively, assuming that R=6.5 Mps.

In general, a maximum of 1.2 s of coherence time is guaranteed in indoor space where wireless LANs are commonly employed and, considering Doppler's effect, 500-100 ms is guaranteed. Based on the technical findings, which are obtained from experimental coherence time measurement results and analysis results, that a minimum of 20 bits of VHT signal field packet length is necessary to take full advantage of the maximum coherence time that can be given in indoor environments, the present invention includes the following settings: the signal field packet length for VHT packets is set 20 bits for transmission; and, according to Doppler's effect, the field length for the signal field packet length of VHT packets is set N bits (21>N>16).

In this connection, the present invention includes the following settings: the channel type in the VHT signal field format is 20 MHz mode; the lowest transmission rate is selected; and the packet length field portion is given a value obtained by calculating the time necessary to transmit the corresponding packet.

Therefore, protection intervals in the case of a synchronous VHT mode and in the case of an asynchronous VHT mode can be set by Equations 10 and 11 below, and the NAV can be set by Equation 12 below.

VHT-SIG duration of corresponding data packet in case of synchronous VHT-mode packet=Max (transmission time for multiple packets (excluding preamble and signal field))+SIFS time+acknowledgement packet transmission time (10)

VHT-SIG duration of corresponding data packet in case of asynchronous VHT-mode packet=transmission time from first packet (excluding preamble and signal field) to last packet+SIFS time+acknowledgement packet transmission time (11)

NAV=VHT-SIG duration−TXTIME+aPreambleLength+aPLCPHeaderLength (11)

In Equation 12 above, TXTIME refers to time necessary to transmit the entire PPDU; aPreambleLength refers to time necessary to transmit VHT-STF+VHT-LTF; and aPLCPHeaderLength refers to time necessary to transmit VHT-SIG.

As such, the present invention includes a signal field setup scheme for TXOP protection, depending on the packet type and network configuration, for a wireless LAN system supporting multiple modes, as well as a transmission scheme applying different limitation criteria for aggregation packet generation.

Figure 9:
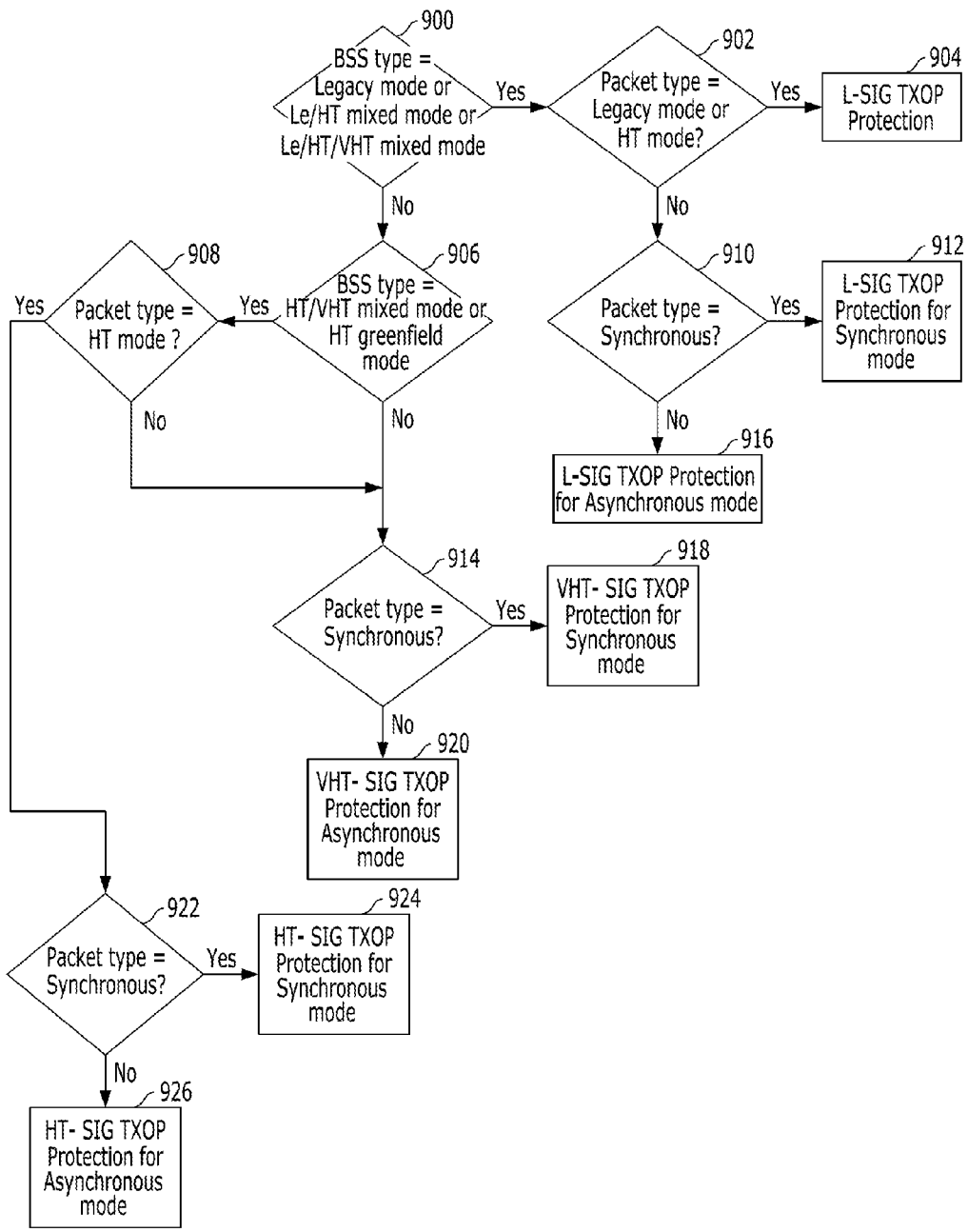
FIG. 9 is a flowchart illustrating a case of setting different TXOP protection schemes in a wireless LAN system supporting multiple modes in accordance with the present invention.

FIG. 9 is a flowchart illustrating a case of setting different TXOP protection schemes in a wireless LAN system supporting multiple modes in accordance with the present invention. The scheme illustrated in FIG. 9 should be applied to both the AP (Access Point), which serves as a base station, and the mobile station (STA), both of which will hereinafter be referred to as a wireless LAN system as a whole.

The wireless LAN system checks whether the BSS is in a legacy mode, in a legacy/HT mixed mode, or in a legacy/HT/VHT mixed mode at step S900. All of these modes are based on legacy, which means that the wireless LAN system checks if the mode includes legacy. In the case of a mode including legacy, the wireless LAN system proceeds to step S902 and, if not, proceeds to step S906. Upon proceeding to the step S902, the wireless LAN system checks whether the packet type is a legacy mode or a packet mode. When it is confirmed as a result of checkup at the step S902 that the packet type is a legacy mode or a HT mode, the wireless LAN system proceeds to step S904 and sets a L-SIG TXOP protection interval.

On the other hand, when it is confirmed as a result of checkup at the step S902 that the packet type is neither a legacy mode nor a HT mode, the wireless LAN system proceeds to step S910 and checks whether the packet type is transmitted synchronously. When it is confirmed as a result of checkup at the step S910 that the packet type is transmitted synchronously, the wireless LAN system proceeds to step S912 and sets L-SIG TXOP protection in a synchronous mode. On the other hand, when it is confirmed as a result of checkup at the step S910 that the packet type is not transmitted synchronously, the wireless LAN system proceeds to step S916 and sets L-SIG TXOP in an asynchronous mode.

Upon proceeding to the step S906 from the step S900, the wireless LAN system checks whether the BSS type is a HT/VHT mixed mode or an HT mode. That is, the wireless LAN system checks whether the mode includes HT. If the mode includes HT, the wireless LAN system proceeds to step S908 and, if not, proceeds to step S914. Upon proceeding to the step S908, the wireless LAN system checks whether the packet type is a HT mode. When it is confirmed as a result of checkup at the step S908 that the packet type is a HT mode, the wireless LAN system proceeds to step S922 and, if not, proceeds to step S914. In this case, the HT mode does not include VHT.

Upon proceeding to step S922, the wireless LAN system checks whether the packet type is synchronous or not. When it is confirmed as a result of checkup at the step S922 that the packet type is synchronous, the wireless LAN system proceeds to step S924 and sets HT-SIG TXOP protection synchronously. On the other hand, when it is confirmed as a result of checkup at the step S922 that the packet type is not synchronous, the wireless LAN system proceeds to step S926 and sets HT-SIG TXOP protection asynchronously.

On the other hand, upon proceeding to step S914 from step S906 or S908, the wireless LAN system checks whether the packet type is synchronous or not. When it is confirmed as a result of checkup at the step S914 that the packet type is synchronous, the wireless LAN system proceeds to step S918 and sets a VHT-SIG protection interval synchronously. On the other hand, when it is confirmed as a result of checkup at the step S914 that the packet type is not synchronous, the wireless LAN system proceeds to step S920 and sets a VHT-SIG protection interval asynchronously.

To summarize, FIG. 9 illustrates a transmission scheme of applying different TXOP protection schemes, depending on the BSS type and whether a synchronous mode is used or not, in a wireless LAN system supporting multiple modes. That is, when the BSS is in a mixed mode of legacy, HT, and VHT modes, in a legacy/HT mixed mode, or in a legacy mode, a TXOP protection scheme using a legacy signal field is used unless the packet type is a VHT mode. Otherwise, different TXOP protection schemes are applied, as mentioned above, according to whether the mode is synchronous or asynchronous. The wireless LAN system also makes a distinction between when the BSS is in a HT/VHT mixed mode or in a HT Greenfield mode and when in a VHT mode, and applies different TXOP protection schemes accordingly, as mentioned above.

Figure 10:
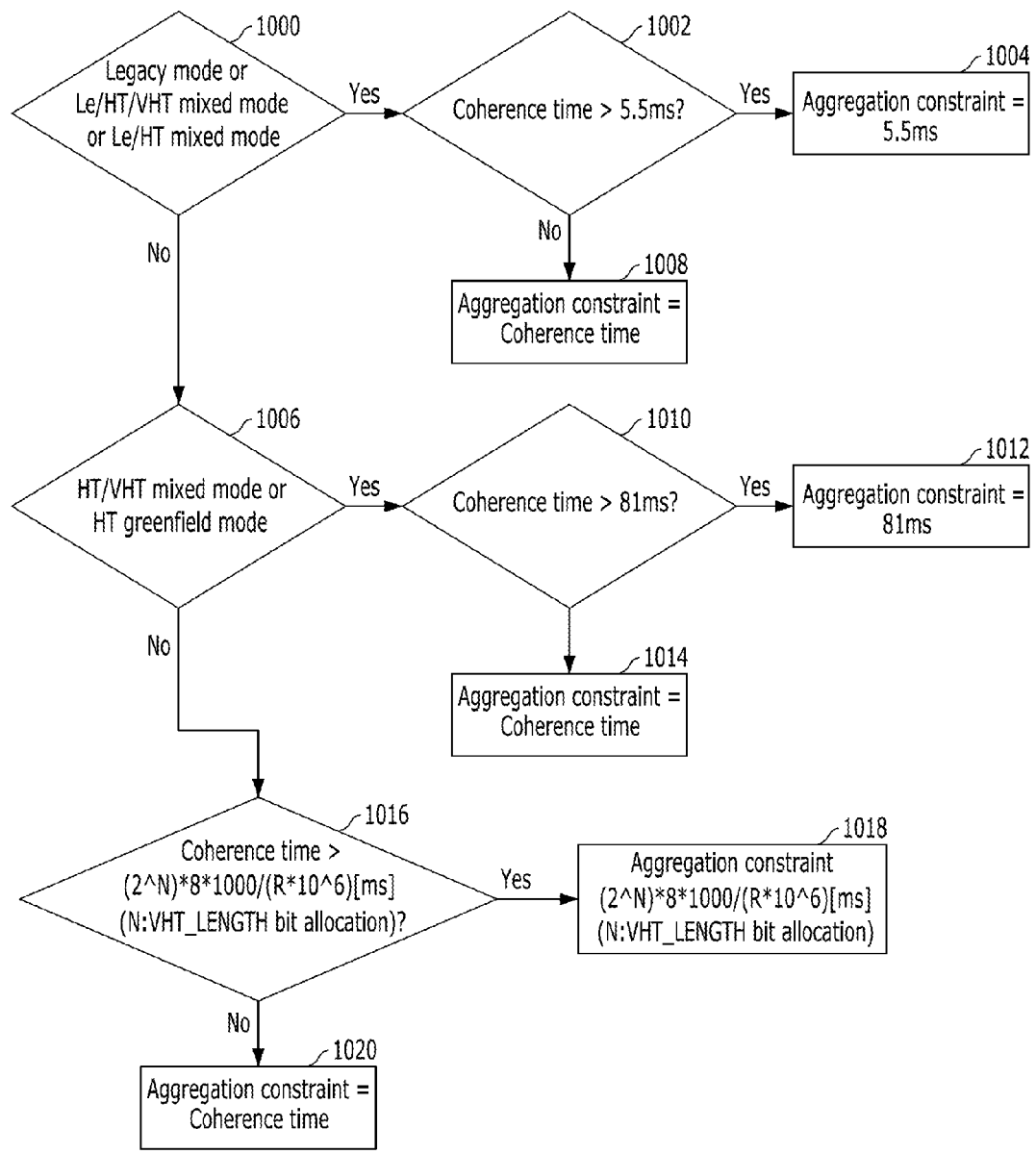
FIG. 10 is a flowchart illustrating an adaptive aggregation transmission scheme in accordance with an embodiment of the present invention.

FIG. 10 is a flowchart illustrating an adaptive aggregation transmission scheme in accordance with an embodiment of the present invention. The scheme illustrated in FIG. 10 should be applied to both the AP, which serves as a base station, and the STA, both of which will hereinafter be referred to as a wireless LAN system as a whole.

The wireless LAN system checks whether the mode is a legacy mode, a legacy/HT mixed mode, or a legacy/HT/VHT mode at step S1000. In other words, the wireless LAN system checks whether the mode includes legacy or not at the step S1000. When it is confirmed as a result of checkup at the step S1000 that the mode includes legacy, the wireless LAN system checks whether the coherence time is larger than a predetermined first time, e.g. 5.5 ms, at step S1002. When it is confirmed that the coherence time is larger than the predetermined first time, the wireless LAN system proceeds to step S1004 and aggregates data, which constitutes a packet, at a length of 5.5 ms. On the other hand, when it is confirmed as a result of checkup at the step S1002 that the coherence time is not larger than 5.5 ms, the wireless LAN system proceeds to step S1008 and aggregates data, which constitutes a packet, in conformity with the coherence time.

Meanwhile, when it has been confirmed as a result of checkup at the step S1000 that no legacy mode is included and the wireless LAN system has proceeded to step S1006, it checks whether the mode is a HT/VHT mixed mode or a HT Greenfield mode. That is, the wireless LAN system checks whether a HT mode is included or not. When it is confirmed as a result of checkup at the step S1006 that a HT mode is included, the wireless LAN system proceeds to step S1010 and, if not, proceeds to step S1016.

Upon proceeding to step S1016, the wireless LAN system checks whether coherence time is larger than a predetermined second time (e.g. 81 ms), which is larger than the predetermined first time. When it is confirmed as a result of checkup at the step S1010 that the coherence time is larger than the predetermined second time, the wireless LAN system proceeds to step S1012 and aggregates data, which is to constitute a packet, in conformity with 81 ms. When it is confirmed as a result of checkup at the step S1010 that the coherence time is smaller, the wireless LAN system proceeds to step S1014 and aggregates data, which is to constitute a packet, on conformity with the corresponding time.

On the other hand, upon proceeding to step S1016 from the step S1006, the wireless LAN system checks whether the coherence time is larger than a predetermined third time, e.g. $(2^N)*8*1000/(R*10^6)$ ms, and, if so, proceeds to step S1018 and aggregates data, which is to constitute a packet, as much as the predetermined third time. When the coherence time is shorter than the predetermined third time, the wireless LAN system proceeds to step S1020 and aggregates data, which is to constitute a packet, in conformity with the corresponding coherence time.

According to the present invention, which has been described so far, different criteria are applied, depending on the coherence time and supported mode, in determining the aggregation maximum length for aggregation transmission. This guarantees that, based on the given transmission rate, channel resources are utilized sufficiently for transmission. Specifically, in the case of a mixed mode including a legacy mode, or in the case of a mode using legacy only, the maximum aggregation length is limited to 5.5 ms as long as a channel coherence time of more than 5.5 ms is guaranteed. When the channel coherence time is smaller than 5.5 ms, the maximum aggregation length is set below the coherence time.

On the other hand, in the case of a HT/VHT mixed mode having no legacy mode, or in the case of a HT Greenfield mode, the maximum aggregation length is limited to 81 ms as long as a coherence time of more than 81 ms is guaranteed. When the channel coherence time is smaller than 81 ms, the maximum aggregation length is set below the coherence time.

Finally, in the case of a VHT Greenfield mode, the coherence time is compared with a TXOP protection guarantee interval determined by the packet length information bit number of the VHT signal field, as well as by the transmission rate information value. When a coherence time larger than $(2^N)*8*1000/(R*10^6)$ ms is guaranteed, the maximum aggregation length is limited to $(2^N)*8*1000/(R*10^6)$ ms. When the coherence time is smaller than $(2^N)*8*1000/(R*10^6)$ ms, the maximum aggregation length is set below the coherence time.

In accordance with the exemplary embodiments of the present invention, signal field setup for TXOP protection in a wireless LAN supporting multiple modes, as well as the packet length for aggregation transmission, can be optimized for the transmission mode and network environment. Specifically, in the case of a VHT-mode transmission scheme employing multi-user multi-antenna technology and multi-channel transmission technology of VHT standards (IEEE 802.11ac), which are currently studied as the next-generation wireless LAN technology standards, TXOPs are guaranteed by a signal field setup method different from conventional methods. The present invention also improves throughput in a wireless LAN system.

While the present invention has been described with respect to the specific embodiments, it will be apparent to those skilled in the art that various changes and modifications may be made without departing from the spirit and scope of the invention as defined in the following claims.

What is claimed is:

1. A method for guaranteeing a data frame transmit opportunity in a wireless LAN system having three different transmission modes, the method comprising:
    setting a first transmission protection interval based on a mode having a lowest transmission rate among the three transmission modes when a node of the mode having the lowest transmission rate exists in the wireless LAN system, aggregating a data frame to be transmitted within a time of the first transmission protection interval, and transmitting the data frame; and
    setting a second transmission protection interval based on a mode having a highest transmission rate among the three transmission modes when only nodes of the mode having the highest transmission rate exist in the wireless LAN system, aggregating a data frame to be transmitted within a time of the second transmission protection interval, and transmitting the data frame.

2. The method of claim 1, wherein in setting the first transmission protection interval,
    when simultaneous transmission of different data frames to at least two nodes is necessary, the first transmission protection interval is set during a time interval of a longest data frame among the data frames to be transmitted to respective nodes.

3. The method of claim 1, further comprising:
    setting a maximum protection interval for data frame transmission when a coherence time within the wireless LAN system is equal to or greater than a maximum time of each transmission protection interval when setting the first and second transmission protection intervals.

4. The method of claim 3, wherein the coherence time of the first transmission protection interval is set to be a longest time that can be set as the first transmission protection interval.

5. The method of claim 3, wherein the coherence time of the second transmission protection interval is set to be a longest time that can be set as the second transmission protection interval.

6. The method of claim 1, further comprising:
    setting a protection interval for data frame transmission in conformity with a coherence time when the coherence time within the wireless LAN system is less than a maximum time of each transmission protection interval setup during the first and second transmission protection interval setup.

7. The method of claim 1, wherein in setting the first transmission protection interval or in setting the second transmission protection interval,
    when simultaneous transmission of different data frames to at least two nodes is necessary, a multi-antenna technology is used for transmission to different nodes.

8. The method of claim 1, wherein, when a packet type is a synchronous mode during the setting of the second transmission protection interval, the second transmission protection interval is set to be in a synchronous mode at a signal field of the mode having the highest transmission rate among the three transmission modes.

9. The method of claim 1, wherein, when a packet type is an asynchronous mode during the second transmission protection interval setup, the second transmission protection interval is set to be in an asynchronous mode at a signal field of the mode having the highest transmission rate among the three transmission modes.

10. A method for guaranteeing a data frame transmit opportunity in a wireless LAN system having three different transmission modes, the method comprising:

setting a first transmission protection interval based on a mode having a lowest transmission rate among the three transmission modes when a node of the mode having the lowest transmission rate exists in the wireless LAN system, aggregating a data frame to be transmitted within a time of the first transmission protection interval, and transmitting the data frame; and setting a second transmission protection interval based on a mode having a highest transmission rate among the three transmission modes when only nodes of a mode having a second highest transmission rate among the three transmission modes exist in the wireless LAN system, aggregating a data frame to be transmitted within a time of the second transmission protection interval, and transmitting the data frame.

11. The method of claim 10, wherein in setting the first transmission protection interval, when simultaneous transmission of different data frames to at least two nodes is necessary, the first transmission protection interval is set during a time interval of a longest data frame among the data frames to be transmitted to respective nodes.

12. The method of claim 10, further comprising:

setting a maximum protection interval for data frame transmission when a coherence time within the wireless LAN system is equal to or greater than a maximum time of each transmission protection interval when setting the first and second transmission protection intervals.

13. The method of claim 12, wherein the coherence time of the first transmission protection interval is set to be a longest time that can be set as the first transmission protection interval.

14. The method of claim 12, wherein the coherence time of the second transmission protection interval is set to be a longest time that can be set as the second transmission protection interval.

15. The method of claim 10, further comprising:

setting a protection interval for data frame transmission in conformity with a coherence time when the coherence time within the wireless LAN system is less than a maximum time of each transmission protection interval when setting the first and second transmission protection intervals.

16. The method of claim 10, wherein in setting the first transmission protection interval or in setting the second transmission protection interval, when simultaneous transmission of different data frames to at least two nodes is necessary, a multi-antenna technology is used for transmission to different nodes.

17. The method of claim 10, wherein, when a packet type is a synchronous mode during the second transmission protection interval setup, the second transmission protection interval is set to be in a synchronous mode at a signal field of the mode having the highest transmission rate among the three transmission modes.

18. The method of claim 10, wherein, when the packet type is an asynchronous mode during the second transmission protection interval setup, the second transmission protection interval is set to be in an asynchronous mode at a signal field of the mode having the highest transmission rate.

19. A method for guaranteeing a data frame transmit opportunity in a wireless LAN system having three different transmission modes, the method comprising:

setting a first transmission protection interval based on a mode having a lowest transmission rate among the three different transmission modes when a node of the mode having the lowest transmission rate exists in the wireless LAN system;

setting a second transmission protection interval based on a mode having a highest transmission rate among the three transmission modes when only nodes of the mode having one of the highest transmission rate and a second highest transmission rate among the three transmission modes exist in the wireless LAN system; and aggregating a signal field indicating each of the first and second transmission protection intervals to each of data frames to be transmitted within time of the set transmission protection intervals, and transmitting the data frames.

* * * * *